United States Patent Office 3,655,655
Patented Apr. 11, 1972

3,655,655
PROCESS OF PREPARING 5-BENZYL-3-FURAN-
METHANOL AND INTERMEDIATES THEREFOR
Gino R. Treves, Princeton, Pa., assignor to
FMC Corporation, New York, N.Y.
No Drawing. Filed Oct. 31, 1969, Ser. No. 875,603
Int. Cl. C07d 5/20
U.S. Cl. 260—240 D               12 Claims

ABSTRACT OF THE DISCLOSURE 5-benzyl-3-furanmethanol, a useful intermediate for producing insecticides of low mammalian toxicity, is prepared by heating at about 100° C. and in the presence of a hydrolyzing agent an acetylene compound of the formulae:

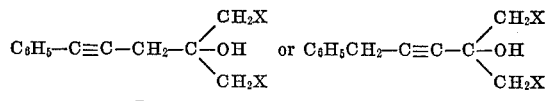

I                                II wherein X is —OH or a group hydrolyzable to —OH.
Where X is chlorine, I is derived by reacting $$C_6H_5C\equiv C-M$$

with

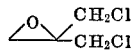

while II is derived from $C_6H_5CH_2C\equiv CM$ and $CO(CHX)$ where M represents an alkali metal or Mg halide.

BACKGROUND OF THE INVENTION

(A) Field of the invention

This invention relates to furan chemistry and is particularly concerned with a new and improved synthesis of 5-benzyl-3-furanmethanol.

(B) Description of the prior art 5-benzyl-3-furanmethanol is a known compound which is a key intermediate in the manufacture of chrysanthemate esters, a class of potent insecticides having remarkably low mammalian toxicity. According to an article published in Nature 213, 493 (1967), the 5-benzyl-3-furanmethanol ester of (±)-cis-trans-chrysanthemic acid exhibits the highest insecticidal activity of any compound containing only carbon, hydrogen and oxygen. It is not surprising, therefore, that a great deal of effort is being directed toward reducing the cost of these new materials to the point whereby they will be commercially attractive.

Generally speaking, the chief difficulty is finding a satisfactory source of the requisite 5-benzyl-3-furanmethanol. Presently, it is derived from phenylacetonitrile by a 7-step synthesis, details of which are given in U.S. Pat. 3,466,304, Sept. 9, 1969.

SUMMARY OF THE INVENTION

I have now discovered a new and improved process of producing 5-benzyl-3-furanmethanol comprising the cyclization, under basic conditions, of an acetylenic triol selected from the class consisting of:

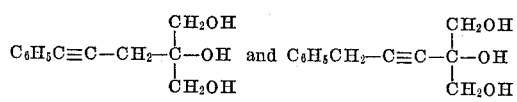

Ia                                IIa thereby forming an intermediate cyclic compound of the formula:

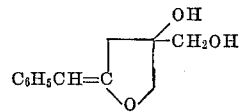

which is then heated, in the presence of a strong base, to a sufficiently high temperature to effect elimination of a molecule of water thereby forming the desired 5-benzyl-3-furanmethanol, the acetylenic triol Ia being derived as follows:

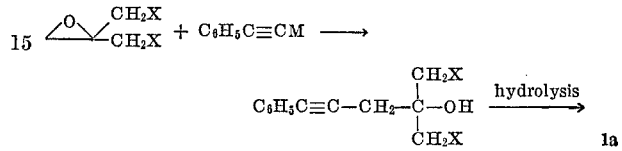

Ia the acetylenic triol IIa being derived as follows:

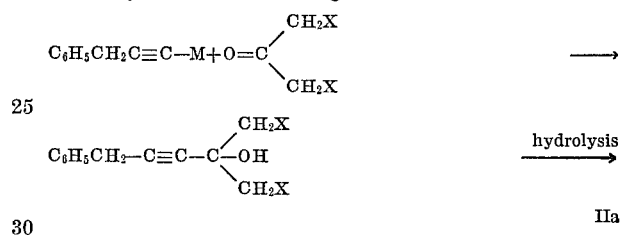

IIa wherein X designates a group hydrolyzable to an OH group and M designates an alkali metal or Mg halide. The new process herein requires considerably less intermediate steps than the processes heretofore in arriving at 5-benzyl-3-furanmethanol from available raw material sources. Hence the new process affords savings in the costs of materials and time over the present practices.

GENERAL DESCRIPTION AND PREFERRED EMBODIMENTS

In carrying out the invention, generally satisfactory results are achieved by treating the acetylenic triol or a suitable hydrolytic precursor in a polar media, in the presence of a strong base and at a temperature sufficient to effect ring closure to form the intermediate cyclic compound. This may be isolated as such or the reaction mixture heated with additional base whereby a mole of water is eliminated from the cyclic intermediate thereby forming the 5-benzyl-3-furanmethanol. We have found that an aqueous solution of a water soluble, normally liquid, relatively inert organic solvent serves as an excellent polar media for effecting ring closure of the acetylenic triol. Exemplary solvents include methanol, ethanol, dimethylsulfoxide, tetrahydrofuran, lower glycols and ethers thereof and the like. Suitable bases include the carbonates and hydroxides of the alkali and alkaline earth metals, e.g., sodium carbonate, potassium carbonate, potassium hydroxide, sodium hydroxide, barium hydroxide, as well as the fully substituted ammonium hydroxide, e.g. (tetramethylammonium hydroxide, benzyltrimethylammonium hydroxide, tetraethylammonium hydroxide and the like. In general, the alkali metal carbonates are effective for treating the actylene triol to form the cyclic intermediate while the alkali metal hydroxides are effective in bringing about elimination of water from the intermediate. An especially convenient and efficacious procedure consists of refluxing the acetylenic triol in aqueous dimethylsulfoxide in the presence of potassium carbonate until cyclization takes place and then adding potassium hydroxide to cause elimination of water from the cyclic intermediate and resultant production of 5-benzyl-3-furanmethanol. Normally, ring closure occurs smoothly at around 100° C. while elimination of water takes place in the range of about 100° C. to about 200° C. The 5-benzyl-3-furanmethanol is conveniently isolated from the reaction by distillation.

The acetylenic triols herein, as far as we are aware, are novel chemical entities and accordingly constitute an invention of new compounds. The acetylenic triol Ia can be prepared for example by reacting the alkali metal, e.g., lithium, sodium, potassium, etc. or Mg halide derivatives of phenylacetylene with 2-chloromethylepichlorohydrin to form the novel 1-chloro-2-chloromethyl-5-phenyl - 4-propyn-2-ol which is then treated with base to hydrolyze the two chloro groups to hydroxy groups thereby forming the triol I. In the case of the acetylene triol IIa supra, this is prepared by reacting the alkali metal or Mg halide derivative of benzylacetylene with a 1,3-disubstituted acetone wherein the substituents are hydrolyzable to —OH, groups. The hydrolysis involves aqueous media of the type supra; if basic conditions are required, the base is an alkali metal carbonate such as potassium carbonate.

Examples of X useful in reactions affording I and II include acyloxy, e.g. $CH_3COO—$, $C_2H_5COO—$, $C_3H_7COO—$ $C_6H_5COO—$ and the like; halide such as chloro or bromo or the like or a readily cleavable ether, e.g. benzyloxy, 2-tetrahydropyranyloxy and the like.

Reference is now made to the following non-limiting examples:

PREPARATION OF 5-BENZYL-3-FURANMETHANOL (A) From the triol:

Ia 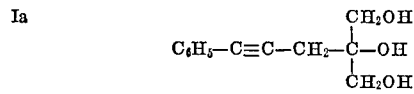

(1) Isolation of the intermediate cyclic compound 2-benzylidene-4-hydroxy-4-hydroxymethyltetrahydrofuran.

A solution of 2.4 g. (0.01 mole) of 1-chloro-2-chloromethyl-5-phenyl-1-pentyn-2-ol in 10 ml. of dimethyl sulfoxide was added to a solution of 2.0 g. of potassium carbonate in 20 ml. of water. The mixture was heated under reflux with good stirring for 17 hours. There was then added 0.70 g. of potassium hydroxide and the mixture refluxed for 2 hours longer. It was cooled and extracted with ether, dried over anhydrous sodium carbonate, and filtered. The ether was partly removed, petroleum ether added resulting in the formation a crystalline material; M.P. 109–111° C.

Analysis.—Calcd. for $C_{12}H_{14}O_3$ (percent): C, 69.88; H, 6.84. Found (percent): C, 69.64; H, 6.60.

Most of the above obtained crystalline material was combined with the mother liquor and distilled. There was obtained 0.70 g. of 5-benzyl-3-furanmethanol.

(2) Forming the triol Ia in situ and without isolating the intermediate cyclic compound.

A solution of 195 g. (0.8 mole) of 1-chloro-2-chloromethyl-5-phenyl-4-pentyn-2-ol in 802 ml. of dimethyl sulfoxide was added to a solution of 160 g. (1.16 moles) of potassium carbonate in 1600 ml. of water. The mixture was heated under reflux with good stirring for 17 hours. Potassium hydroxide (50 g.) then was added in one portion and the mixture refluxed for an additional 3 hours. The cooled reaction mixture was extracted several times with chloroform and the extracts dried over anhydrous sodium carbonate. Distillation yielded 38 g. of a fraction, B.P. 130–140° C. (0.5 mm.). At this point 2 g. of powdered potassium hydroxide was added to the distilling flask to catalyze water elimination. A fraction, B.P. 136–140° C. (0.77 mm.) (60.7 g.), was collected. The N.M.R. spectra of both fractions were essentially identical. The combined yield of 5-benzyl-3-furanmethanol was 65%.

The intermediate 1-chloro-2-chloromethyl-5-phenyl-4-pentyn-2-ol was prepared as follows:

To a Grignard reagent prepared from 4.32 (0.18 g. atom) of Mg and 16.6 g. (0.18 mole) of n-butylchloride in 60 ml. of tetrahydrofuran there was added dropwise 18.4 g. (0.18 mole) of phenylacetylene in 20 ml. of tetrahydrofuran. This was followed by the dropwise addition at 30° C. of 12.15 g. (0.09 mole) 2-chloro-methylepichlorohydrin prepared by epoxidizing 3-chloro-2-chloro methyl-1-propene with peracetic acid. The mixture was left at room temperature for 60 hours and then poured over ice and hydrochloric acid. The mixture was extracted with ether, dried over anhydrous magnesium sulfate, filtered, and the solvent removed in vacuo. Upon distillation, a 15 g. fraction, B.P. 100–110° C. (0.25 mm.), was obtained; the yield amounted to 70% based on 2-chloroethylepichlorohydrin.

Analysis.—Calcd. for $C_{12}H_{12}Cl_2O$ (percent): C, 59.28; H, 4.97. Found (percent): C, 58.99; H, 4.67.

(3) Preparation and isolation of the triol Ia.

A solution of 4.8 g. (0.02 mole) of 1-chloro-2-chloromethyl-5-phenyl-4-pentyn-2-ol in 20 ml. of dimethyl sulfoxide was added to a solution of 4.0 g. potassium carbonate in 40 ml. of water. The mixture was heated under reflux with good stirring for 17 hours. The reaction mixture was extracted with ether, most of the water and dimethyl sulfoxide removed from the aqueous layer and the residue extracted with t-butanol. The ether and t-butanol extracts were combined, the solvents removed, and the residue distilled. There was obtained 2.5 g. of distillate, 0.15 mm., B.P. 187° C. which crystallized in the receiving flask. The material was recrystallized from benzene to give 2.0 g. of purified triol Ia melting at 81–82° C.

Analysis.—Calcd. for $C_{12}H_{14}O_3$ (percent): C, 69.88; H, 6.84. Found (percent) C, 69.78; H, 7.13.

To 1 g. (0.005 mole) of 2-hydroxymethyl-5-phenyl-3-pentyn-1, 2-diol, a catalytic amount of sodamide was added. The flask was heated at a temperature between 90 and 135° C. under vacuum (0.1 mm.). A colorless distillate, 0.4 g. (42%), was collected; crystallization from methylcyclohexane containing a few drops of ether gave 5-benzyl-3-furanmethanol, M.P. 34–40° C.

(B) From the triol:

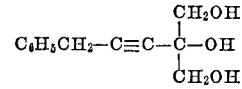

IIa (1) Isolation of the intermediate cyclic compound 2-benzylidene - 4 - hydroxy - 4 - hydroxymethyltetrahydrofuran; triol IIa not isolated but formed in situ.

A solution of 5.8 g. (0.02 mole) of 1-acetoxy-2-acetoxymethyl-2-hydroxy-5-phenyl-3-pentyne in 20 ml. of methanol was added to a solution of 5.0 g. of potassium hydroxide in 20 ml. of water and heated under reflux for 2 hr. The reaction mixture was poured over ice and extracted with ether. The ether solution was dried over anhydrous sodium carbonate, filtered and concentrated. The residue was heated with benzene and filtered. There was obtained 1.7 g. of material, M.P. 110–114° C. From the filtrate 0.4 g. of material, M.P. 108–110° C., was obtained. The N.M.R. spectrum indicated these materials to be a mixture of cis and trans isomers of 2-benzylidene-4-hydroxy-4-hydroxymethyltetrahydrofuran.

Analysis.—Calcd. for $C_{12}H_{14}O_3$ (percent): C, 69.88; H, 6.84. Found (percent): C, 69.39; H, 7.06.

Upon heating 1.2 g. (0.006 mole) of 2-benzylidene-4-hydroxy - 4 - hydroxymethyltetrahydrofuran obtained above at about 130–180° C. and distilling, 0.7 g. (63%) of 5-benzyl-3-furanmethanol, B.P. 120–130° C. (0.6 mm.), was obtained which crystallized upon chilling, M.P. 39–41° C.

The requisite 1 - acetoxy-2-acetoxymethyl-2-hydroxy-5-phenyl-3-pentyne was prepared as follows:

To 34 ml. (0.11 mole) of an approximately 3.0 molar solution of methylmagnesium chloride in tetrahydrofuran there was added dropwise 11.6 g. (0.1 mole) of benzylacetylene (3-phenyl-1-propyne). While the mixture was cooled at −60° C., there was added dropwise 17.4 g. (0.1 mole) of 1,3-diacetoxy-2-propanone in 20 ml. of tetrahydrofuran. The mixture was left at room temperature for 56 hours, then was poured over ice and hydrochloric acid, and was extracted with ether. The extracts were dried over anhydrous magnesium sulfate, filtered, and the ether removed in vacuo. Upon distillation, there was obtained 13 g. (45%) of product, B.P. 180° C. (0.05 mm.).

*Analysis.*—Calcd. for $C_{16}H_{18}O_5$ (percent): C, 66.19; H, 6.25. Found (percent): C, 66.06; H, 6.12.

The 1,3-diacetoxy-2-propanone was obtained as follows:

A solution comprising 100 g. (1.1 mole) of 1,3-dihydroxy-2-propanone in 500 ml. of acetic anhydride and 10 drops of trifluoroacetic acid was heated under reflux for 3 hours. Upon distillation a main fraction, B.P. 75–90° (0.2 mm.) 100 g. was obtained which crystallized in the receiving flask, M.P. 46–48° C. Upon dissolving the forerun in ether-petroleum ether and chilling, 23.4 g. of additional material, M.P. 46–48° C. was obtained for a combined yield of 64%.

(2) Formation of triol IIa in situ from hydrolyzable precursor; intermediate 2-benzylidene - 4 - hydroxy - 4-hydroxymethyl-tetrahydrofuran not isolated.

A solution of 12 g. (0.5 mole) of 1-chloro-2-chloromethyl-5-phenyl-3-pentyn-2-ol in 50 ml. of dimethyl sulfoxide was added to a solution of 10 g. (0.07 mole) of potassium carbonate in 100 ml. of water and heated under reflux for 17 hours. Potassium hydroxide (3.5 g.) then was added in one portion and the mixture was refluxed for an additional 3 hour. The mixture was poured over ice, extracted several times with chloroform and the extracts dried over sodium carbonate. Distillation afforded 4.5 g. (56%) of 5-benzyl-3-furanmethanol, B.P. 110–120° C. (0.1 mm.), which upon cooling crystallized in the receiver; M.P. 37–40° C.

The 1 - chloro - 2 - chloromethyl - 5 - phenyl - 3 -pentyn-2-ol was prepared in the following manner:

To 40 ml. (0.13 mole) of an approximately 3.0 molar solution of methylmagnesium chloride in tetrahydrofuran there was added dropwise 11.6 g. (0.1 mole) of benzylacetylene (3-phenyl-1-propyne). While the mixture was cooled to −10° C., there was added dropwise a solution of 12.6 g. (0.1 mole) of 1,3-dichloro-2-propanone in 25 ml. of tetrahydrofuran. The mixture was left at room temperature for 48 hours, then was poured over ice and hydrochloric acid, and was extracted with ether. The ether extracts were dried over anhydrous magnesium sulfate, filtered and the ether removed in vacuo. Distillation of the residue gave 12.9 g. (53%) of product, B.P. 125–130° C. (0.2 mm.).

*Analysis.*—Calcd. for $C_{12}H_{12}Cl_2O$ (percent): C, 55.62; H, 4.66. Found (percent): C, 55.85; H, 4.93.

(3) The acetylenic triol IIa was also prepared and isolated as follows:

A solution containing 19.6 g. (0.05 mole) of 5-phenyl-1-(tetrahydropyran - 2 - yloxy) - 2 - (tetrahydropyran-2-yloxy-methyl)-3-pentyn-2-ol in 135 ml. methanol and 15 ml. concentrated hydrochloric acid was heated under reflux for 3 hours. The solvent was removed under reduced pressure. The residue was dissolved in benzene from which 5.5 g. (55%) of crystalline material, M.P. 94° C. was obtained.

*Analysis.*—Calcd. for $C_{12}H_{14}O_3$ (percent): C, 69.88; H, 6.84. Found (percent): C, 70.03; H, 6.60.

The requisite 1-(tetrahydropyran-2-yloxy)-2-(tetrahydropyran-2-yloxy-methyl)-3-pentyn-2-ol was prepared as follows:

To a Grignard reagent made from 2.4 g. (0.1 g. atom) of magnesium and 10.9 g. (0.1 mole) of ethyl bromide in 100 ml. of tetrahydrofuran, 11.6 g. (0.1 mole) of benzylacetylene (3-phenyl-1-propyne) was added at 30–40°. After stirring for 0.5 hr., 25.8 g. (0.1 mole) of 1,3-bis(tetrahydropyran-2-yloxy)-2-propanone in 30 ml. of tetrahydrofuran was added dropwise at 30–35° C. After the addition was completed, the mixture was left at room temperature for 17 hours. The mixture was poured over ice and hydrochloric acid, extracted several times with ether and then with chloroform. The combined ether-chloroform extracts were dried over anhydrous magnesium sulfate, filtered, and the solvent removed. The weight of the residue was 26.8 g. (72%).

The 1,3-bis(tetrahydropyran-2-yloxy)-2-propanone was prepared by the following procedure:

A mixture containing 260 g. (3.1 mole) of 3,4-dihydropyran, 100 g. (1.1 mole) of 1,3-dihydroxy-2-propanone and 1 g. of p-toluenesulfonic acid was warmed to about 55–60° C. when an exothermic reaction developed which necessitated external cooling. The reaction mixture then was heated for 2 hours at 90° C., after which it was treated with 2 g. of potassium carbonate. Distillation gave 157 g. (55%) of product, B.P. 110–120° C. (0.001 mm.).

Conversion of acetylenic triol IIa to 5-phenyl-3-pentyn-1,2-diol aforesaid, a catalytic amount of sodamide was added. The flask was heated at a temperature between 90 and 135° under vacuum (0.1 mm.). A colorless liquid distilled, 0.4 g. (42%) was collected which proved to be the desired material. This was dissolved in methylcyclohexane and a few drops of ether. Upon chilling over Dry Ice, crystalline 5-benzyl-3-furanmethanol was obtained, melting at 37–40° C.

What is claimed is:

1. A method of preparing 5-benzyl-3-furanmethanol of the formula:

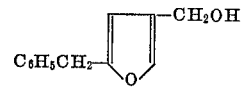

comprising the cyclization, under basic conditions, of an acetylenic triol selected from the class consisting of:

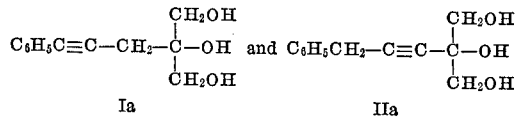

thereby forming an intermediate cyclic compound of the formula:

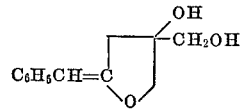

which is then heated, in the presence of a strong base, to a sufficiently high temperature to effect elimination of a molecule of water thereby forming the desired 5-benzyl-3-furanmethanol, the acetylenic triol Ia being derived as follows:

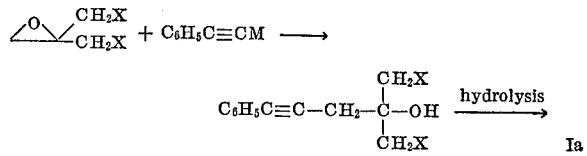

the acetylenic triol II being derived as follows:

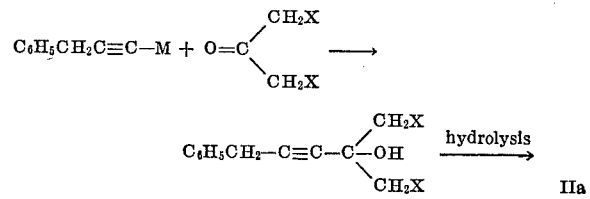

wherein X is a group hydrolyzable to an OH group and M is an alkali metal or Mg halide.

2. The process according to claim 1 wherein M is MgCl.

3. A compound selected from the class consisting of $$C_6H_5CH_2C\equiv C-C(CH_2-X)(CH_2-X)-OH \qquad C_6H_5C\equiv C-CH_2-C(CH_2-X)(CH_2-X)-OH$$

wherein X is —OH, lower alkanoyloxy, benzoyloxy, halogen, benzyloxy and 2-tetrahydropyranyloxy.

4. A compound according to claim 3 wherein X is selected from the class consisting of hydroxy, halogen, lower alkanoyloxy, benzoyloxy and 2-tetrahydropyranyloxy.

5. $$C_6H_5-C\equiv C-CH_2-C(CH_2-OH)(CH_2-OH)-OH$$

6. $$C_6H_5-CH_2-C\equiv C-C(CH_2-OH)(CH_2-OH)-OH$$

7. $$C_6H_5C\equiv C-CH_2-C(CH_2-Cl)(CH_2-Cl)-OH$$

8. [structure: $C_6H_5-CH=C$ with furan ring bearing OH and CH$_2$OH]

9. $$C_6H_5CH_2C\equiv C-C(CH_2-Cl)(CH_2-Cl)-OH$$

10. $$C_6H_5C\equiv C-CH_2-C(CH_2OCOCH_3)(CH_2OCOCH_3)-OH$$

11. $$C_6H_5CH_2C\equiv C-C(CH_2OCOCH_3)(CH_2OCOCH_3)-OH$$

12. A method of preparing 5-benzyl-3-furanmethanol of the formula:

[structure: furan ring with $C_6H_5CH_2$— and —CH$_2$OH substituents]

comprising heating in the presence of a strong base a compound of the formula:

[structure: $C_6H_5CH=C$ with dihydrofuran ring bearing OH and CH$_2$OH]

said heating sufficiently high to effect elimination of a molecule of water from said compound.

References Cited
UNITED STATES PATENTS 2,919,281   12/1959   Chodroff et al. _____ 260—340.5
3,073,848   1/1963    Wasson et al. _____ 260—347.4

HENRY R. JILES, Primary Examiner
G. T. TODD, Assistant Examiner

U.S. Cl. X.R.
260—347.8, 488 CD, 618 D, 618 E

UNITED STATES PATENT OFFICE
CERTIFICATE OF CORRECTION

Patent No. 3,655,655    Dated April 11, 1972

Inventor(s) Gino R. Treves

It is certified that error appears in the above-identified patent and that said Letters Patent are hereby corrected as shown below:

Column 3, line 70 "N.M.R." should read --nmr--.

Column 4, line 28 "0.15" should read --0.015--.

Column 4, line 59 "N.M.R." should read --nmr--.

Column 3, lines 49-50; Column 4, lines 15-16; Column 4, lines 32-33; Column 4, lines 63-64; Column 5, lines 11-12; Column 5, lines 54-55; Column 5, lines 66-67 -"(percent)" should be omitted.

Signed and sealed this 16th day of April 1974.

(SEAL)
Attest:

EDWARD M.FLETCHER,JR.          C. MARSHALL DANN
Attesting Officer              Commissioner of Patents